(12) United States Patent
Peri et al.

(10) Patent No.: US 11,741,676 B2
(45) Date of Patent: Aug. 29, 2023

(54) SYSTEM AND METHOD FOR TARGET PLANE DETECTION AND SPACE ESTIMATION

(71) Applicant: Samsung Electronics Co., Ltd., Suwon-si (KR)

(72) Inventors: Christopher A. Peri, Mountain View, CA (US); Yingen Xiong, Mountain View, CA (US); Haihui Guan, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 17/346,105

(22) Filed: Jun. 11, 2021

(65) Prior Publication Data

US 2022/0230398 A1 Jul. 21, 2022

Related U.S. Application Data

(60) Provisional application No. 63/140,166, filed on Jan. 21, 2021.

(51) Int. Cl.
*G06T 19/00* (2011.01)
*G06T 7/50* (2017.01)
(Continued)

(52) U.S. Cl.
CPC .............. *G06T 19/006* (2013.01); *G06T 7/50* (2017.01); *G06T 7/60* (2013.01); *G06V 20/00* (2022.01);
(Continued)

(58) Field of Classification Search
CPC ... G06T 7/50; G06T 7/60; G06T 2207/10028; G06T 2219/008
See application file for complete search history.

(56) References Cited

U.S. PATENT DOCUMENTS 8,199,977 B2 6/2012 Krishnaswamy et al.
8,660,365 B2 2/2014 Lukas et al.
(Continued)

FOREIGN PATENT DOCUMENTS

CN 105046688 A 11/2015
CN 107358609 A 11/2017
(Continued)

OTHER PUBLICATIONS

Nuchter et al., "Towards semantic maps for mobile robots", Robotics and Autonomous Systems, 56(11), Nov. 2008, pp. 915-926.
(Continued)

*Primary Examiner* — Matthew Salvucci

(57) ABSTRACT

A method includes obtaining scene data, wherein the scene data includes image data of a scene and depth data of the scene, and the depth data includes depth measurement values of points of a point cloud. The method further includes defining a first detection area, wherein the first detection area includes a spatially defined subset of the scene data, defining a plane model based on points of the point cloud within the first detection area, and defining a plane based on the plane model. The method includes determining at least one value of a usable size of the plane based on points of the point cloud, comparing at least one value of a characteristic size of a digital object to the at least one value of the usable size of the plane, and generating a display including the digital object positioned upon the plane based on the plane model.

20 Claims, 12 Drawing Sheets

(51) Int. Cl.
*G06T 7/60* (2017.01)
*G06V 20/00* (2022.01)
(52) U.S. Cl.
CPC ............... *G06T 2207/10028* (2013.01); *G06T 2219/008* (2013.01)

(56) References Cited

U.S. PATENT DOCUMENTS

| | | | |
|---|---|---|---|
| 9,053,547 | B2 | 6/2015 | Kitamura et al. |
| 9,996,974 | B2 | 6/2018 | Reisner-Kollmann et al. |
| 10,025,984 | B2 | 7/2018 | Rajkumar et al. |
| 10,217,234 | B2 | 2/2019 | Lee et al. |
| 10,500,727 | B1 | 12/2019 | Hinterstoisser |
| 10,878,608 | B2 | 12/2020 | Szeliski et al. |
| 2014/0363073 | A1 | 12/2014 | Shirakyan et al. |
| 2015/0062120 | A1* | 3/2015 | Reisner-Kollmann ................. G06T 19/006 345/419 |
| 2017/0046879 | A1 | 2/2017 | Severn |
| 2018/0350099 | A1 | 12/2018 | Yerkes et al. |
| 2019/0197750 | A1 | 6/2019 | Dagley et al. |
| 2020/0311428 | A1 | 10/2020 | Rom |
| 2020/0356240 | A1 | 11/2020 | Paul et al. |
| 2021/0035346 | A1 | 2/2021 | Chen et al. |
| 2021/0090301 | A1* | 3/2021 | Mammou ................. G06T 7/11 |

FOREIGN PATENT DOCUMENTS

| | | |
|---|---|---|
| CN | 110473293 A | 11/2019 |
| KR | 10-2013-0118105 | 10/2013 |
| KR | 10-2014-0033868 A | 3/2014 |
| KR | 10-2016-0048874 | 5/2016 |
| KR | 10-2018-0087947 | 8/2018 |

OTHER PUBLICATIONS

International Search Report and Written Opinion of the International Searching Authority dated May 2, 2022 regarding International Patent Application No. PCT/KR2022/000951, 10 pages original, 10 pages English translation.

* cited by examiner

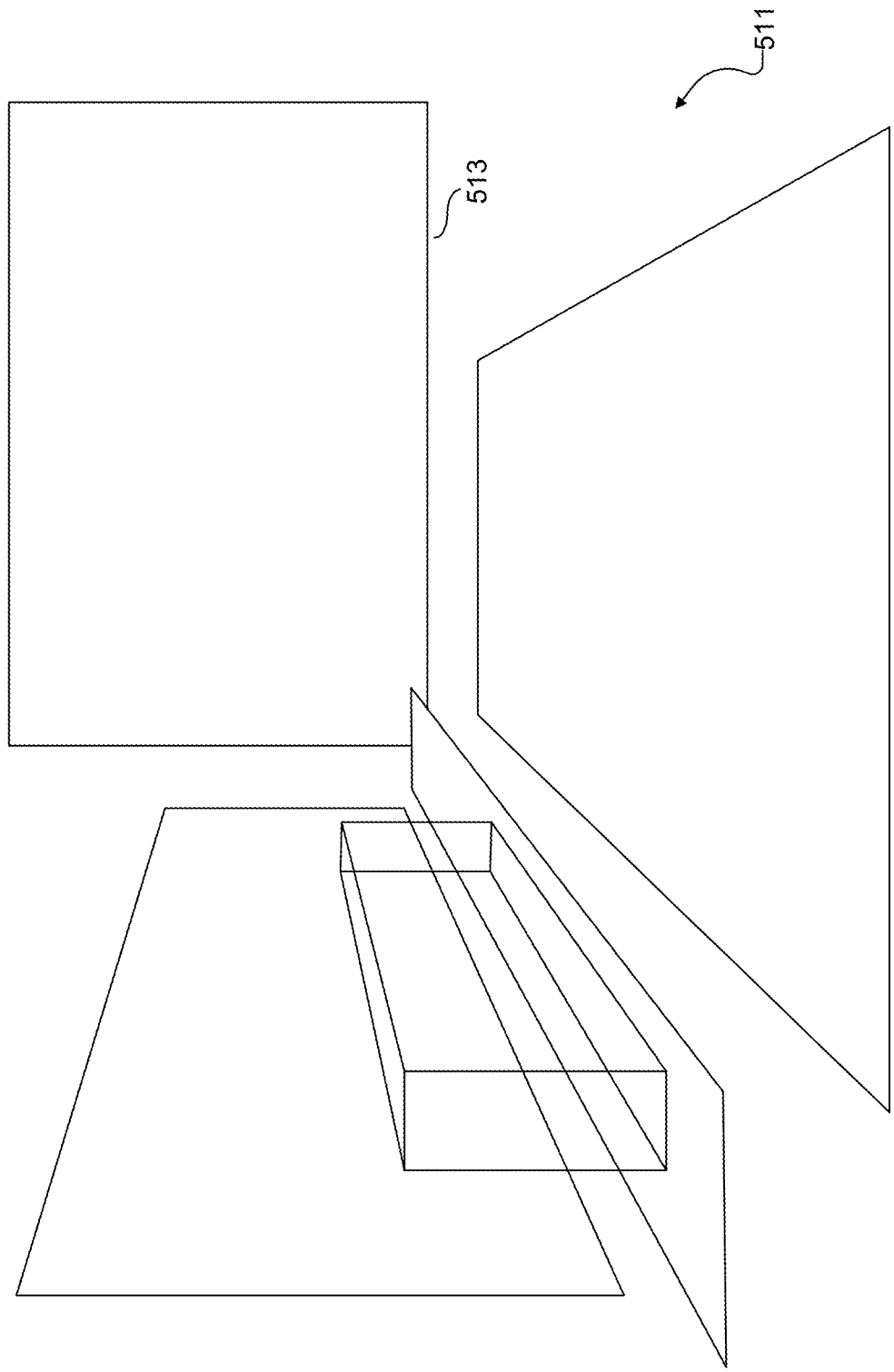

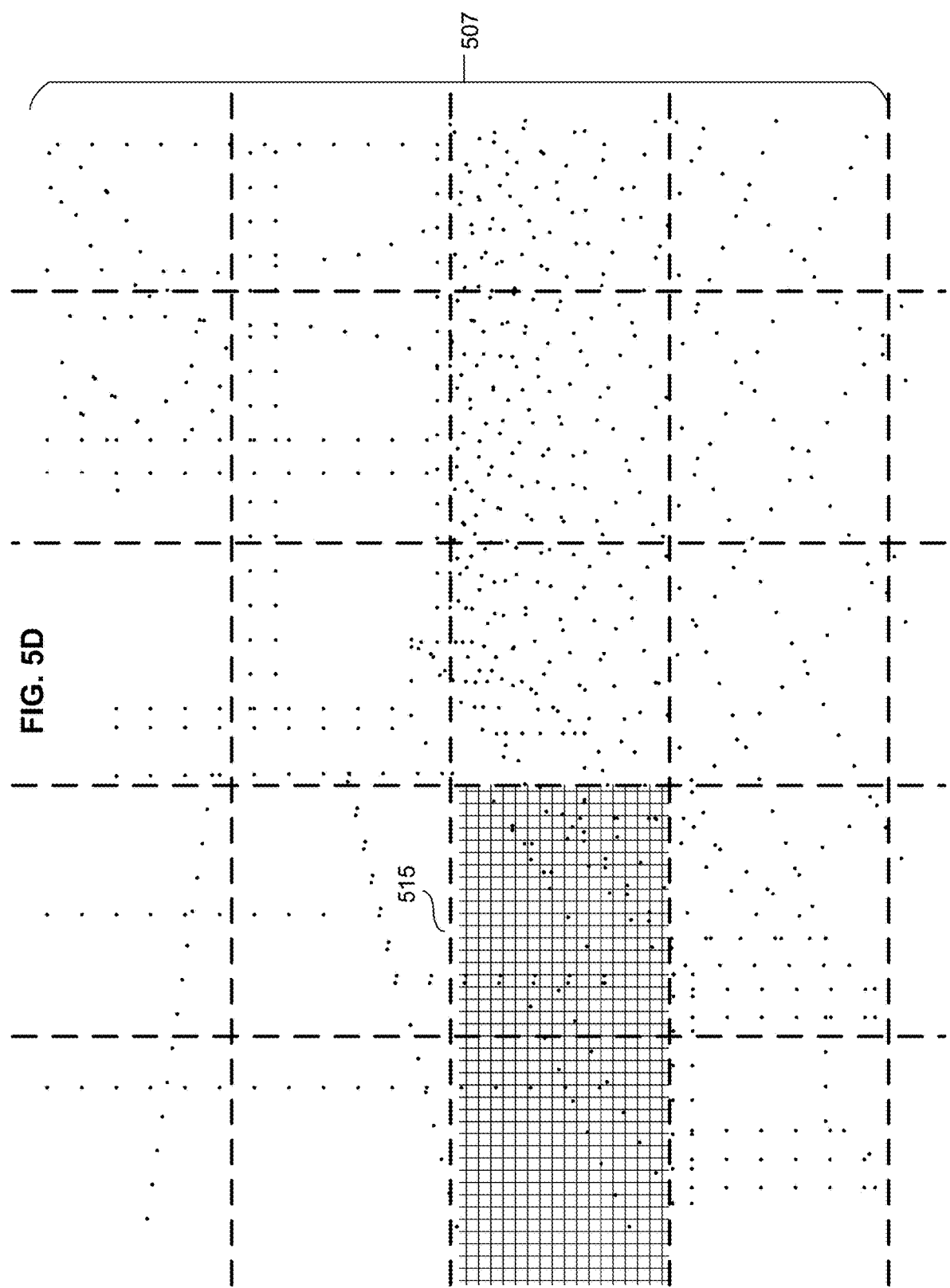

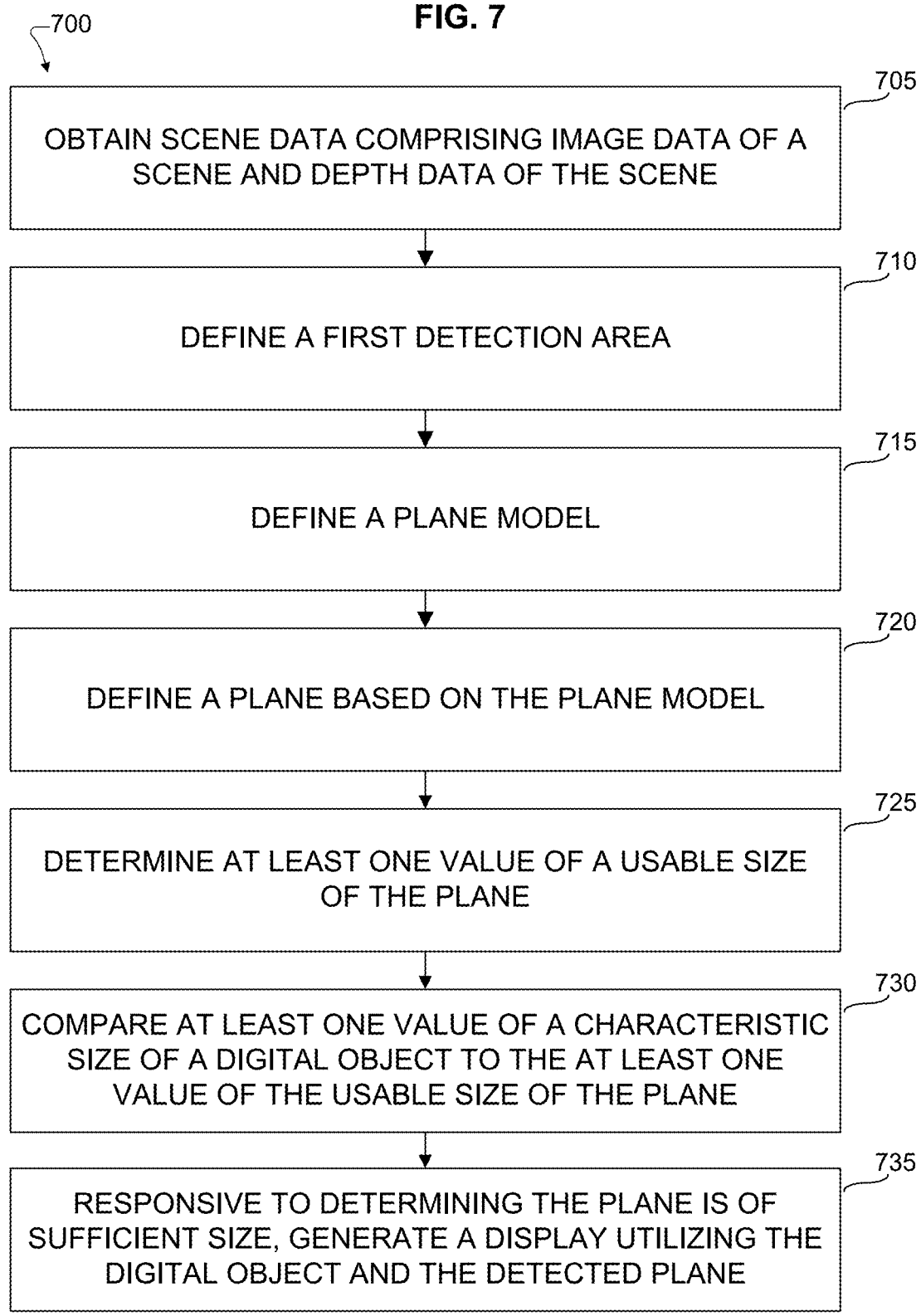

SYSTEM AND METHOD FOR TARGET PLANE DETECTION AND SPACE ESTIMATION

CROSS-REFERENCE TO RELATED APPLICATION AND CLAIM OF PRIORITY

This application claims priority under 35 U.S.C. § 119(e) to U.S. Provisional Patent Application No. 63/140,166 filed on Jan. 21, 2021. The above-identified provisional patent application is hereby incorporated by reference in their entireties.

TECHNICAL FIELD

This disclosure relates generally to computer vision and platforms for augmented reality (AR). More specifically, this disclosure relates to a system and method for target plane detection and space estimation.

BACKGROUND

Augmented reality (AR) and extended reality (XR) experiences, which incorporate digitally controlled content into a user's view of an operating environment (e.g., a real-world environment) through an AR or XR apparatus (for example, a head-mounted display) present unique challenges in terms of managing the limited processing and power resources of the apparatus.

Left unmanaged, the processing loads and power consumption associated with maintaining the apparatus's digital understanding of its world (for example, recognizing physical surfaces for anchoring digital objects) and generating and presenting the XR experience can ramp up rapidly, which, in turn can deplete batteries, decrease the frame rate of the XR experience and generate heat from the processor.

Accordingly, reducing the power consumption and processing loads associated with generating and maintaining a digital world understanding at an XR apparatus remains a source of technical challenges and opportunities for improvement in the fields of computer vision and providing extended reality experiences.

SUMMARY

This disclosure provides a system and method for target plane detection and space estimation.

In a first embodiment, a method includes obtaining scene data, wherein the scene data includes image data of a scene and depth data of the scene, and the depth data includes depth measurement values of points of a point cloud. The method further includes defining a first detection area, wherein the first detection area includes a spatially defined subset of the scene data, defining a plane model based on points of the point cloud within the first detection area, and defining a plane based on the plane model. Still further, the method includes determining at least one value of a usable size of the plane based on points of the point cloud, comparing at least one value of a characteristic size of a digital object to the at least one value of the usable size of the plane, and responsive to determining that the at least one value of the characteristic size of the digital object is less than the at least one value of the usable size of the plane, generating a display including the digital object positioned upon the plane based on the plane model.

In a second embodiment, an apparatus includes a depth sensor, and a memory. The memory contains instructions, which when executed by the processor, cause the apparatus to obtain scene data, wherein the scene data includes image data of a scene from the image sensor and depth data of the scene from the depth sensor, the depth data includes depth measurement values of points of a point cloud. The memory further contains instructions, that when executed by the processor, cause the apparatus to define a first detection area, wherein the first detection area includes a spatially defined subset of the scene data, define a plane model based on points of the point cloud within the first detection area, define a plane based on the plane model, determine at least one value of a usable size of the plane based on points of the point cloud, compare at least one value of a characteristic size of a digital object to the at least one value of the usable size of the plane, and responsive to determining that the at least one value of the characteristic size of the digital object is less than the at least one value of the usable size of the plane, generate a display including the digital object positioned upon the plane based on the plane model.

In a third embodiment, a non-transitory computer-readable medium contains instructions, which when executed by a processor, cause an apparatus to obtain scene data, wherein the scene data includes image data of a scene from an image sensor and depth data of the scene from a depth sensor, the depth data including depth measurement values of points of a point cloud. The medium further contains instructions, that when executed by the processor, cause the apparatus to define a first detection area, wherein the first detection area includes a spatially defined subset of the scene data, define a plane model based on points of the point cloud within the first detection area, define a plane based on the plane model, determine at least one value of a usable size of the plane based on points of the point cloud, compare at least one value of a characteristic size of a digital object to the at least one value of the usable size of the plane, and responsive to determining that the at least one value of the characteristic size of the digital object is less than the at least one value of the usable size of the plane, generate a display including the digital object positioned upon the plane based on the plane model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 5A, 5B, 5C, 5D and 5E provide a visualization of aspects of performing plane detection and space estimation according to certain embodiments of this disclosure;

FIG. 7 illustrates operations of an example of a method for performing plane detection and size estimation according to certain embodiments of this disclosure.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
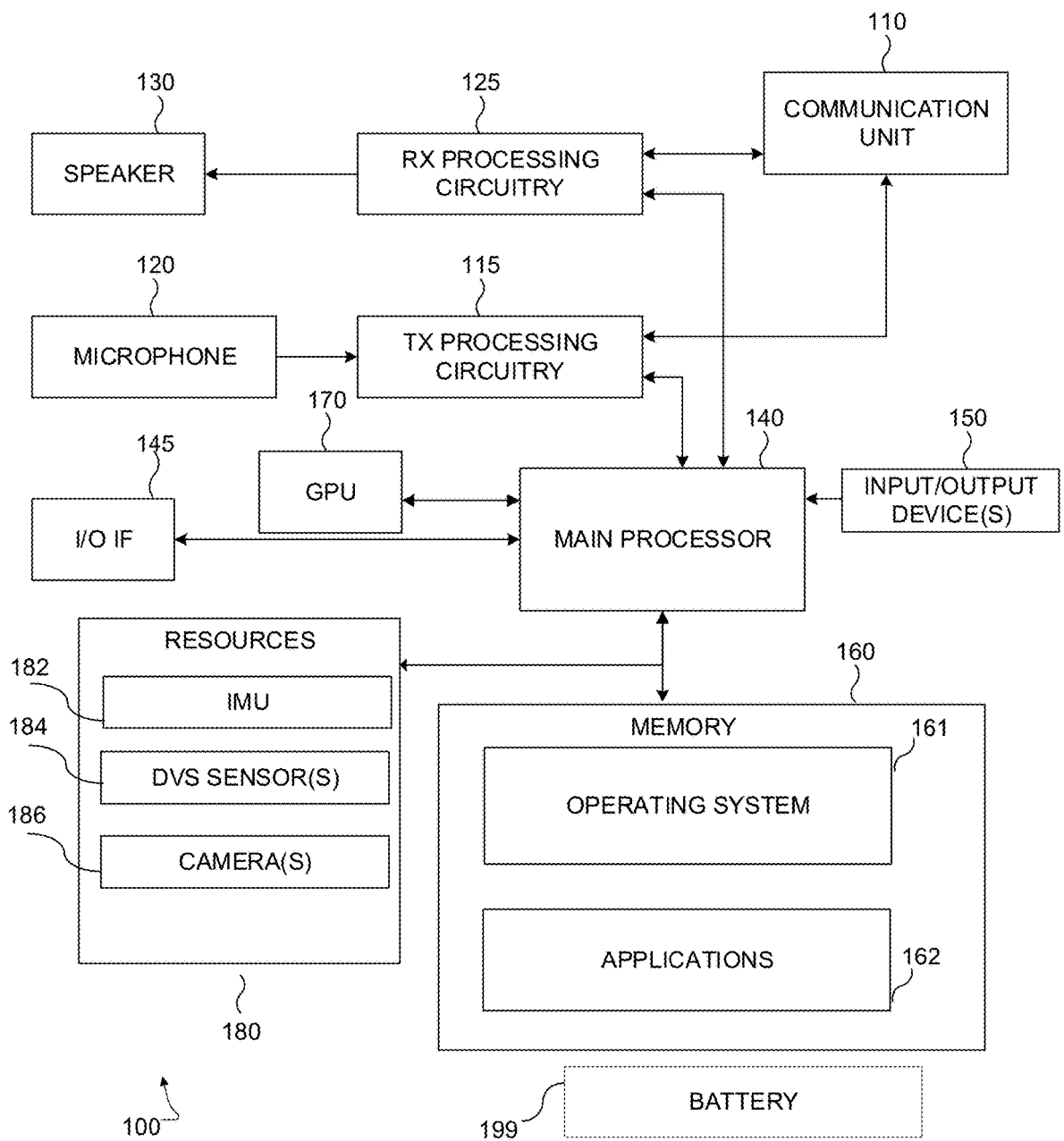
FIG. 1 illustrates an example of an apparatus according to certain embodiments of this disclosure.

FIG. 1 illustrates a non-limiting example of a device 100 operating as a platform for providing an XR experience according to some embodiments of this disclosure. According to various embodiments of this disclosure, device 100 could be implemented as one or more of a smartphone, a tablet, or a head-mounted device (HMD) for providing an augmented reality (AR) experience. In some embodiments, device 100 is a wearable device or otherwise has a small form factor or is otherwise designed such that the weight of the system and heat output from device 100 are significant design considerations. That is, in certain embodiments, device 100 has limited battery and processing resources, which puts a significant premium on providing an XR experience as efficiently as possible, in order to, without limitation, extend the battery life, reduce battery weight, increase frame rates, and reduce heat buildup from heavy use of the processor(s) of device 100.

The embodiment of device 100 illustrated in FIG. 1 is for illustration only, and other configurations are possible. The embodiment of the device 100 shown in FIG. 1 is for illustration only. It is further noted that suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on other platforms are within the contemplated scope of this disclosure.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, extended reality (XR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume or otherwise utilize identifications of planar surfaces in a field of view of visual sensors of device 100.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor which includes control logic for minimizing consumption of battery 199 or minimizing heat buildup in device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial measurement unit (IMU) 182, which can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprise a plurality of DVS sensors with overlapping, or partially overlapping fields of view.

According to various embodiments, the above-described components of device 100 are powered by battery 199 (for example, a rechargeable lithium-ion battery), whose size, charge capacity and load capacity are, in some embodiments, constrained by the form factor and user demands of the device. As a non-limiting example, in embodiments where device 100 is a smartphone, battery 199 is configured to fit within the housing of the smartphone and is configured not to support current loads (for example, by running a graphics processing unit at full power for sustained periods) causing heat buildup. As a further example, in embodiments where device 100 is a head mounted device, the size (and by implication, charge capacity) of battery 199 may be constrained by a need to keep device 100 as light as possible, to reduce neck strain on users and facilitate easy head movement.

Although FIG. 1 illustrates one example of a device 100 for providing an augmented or extended reality experience, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
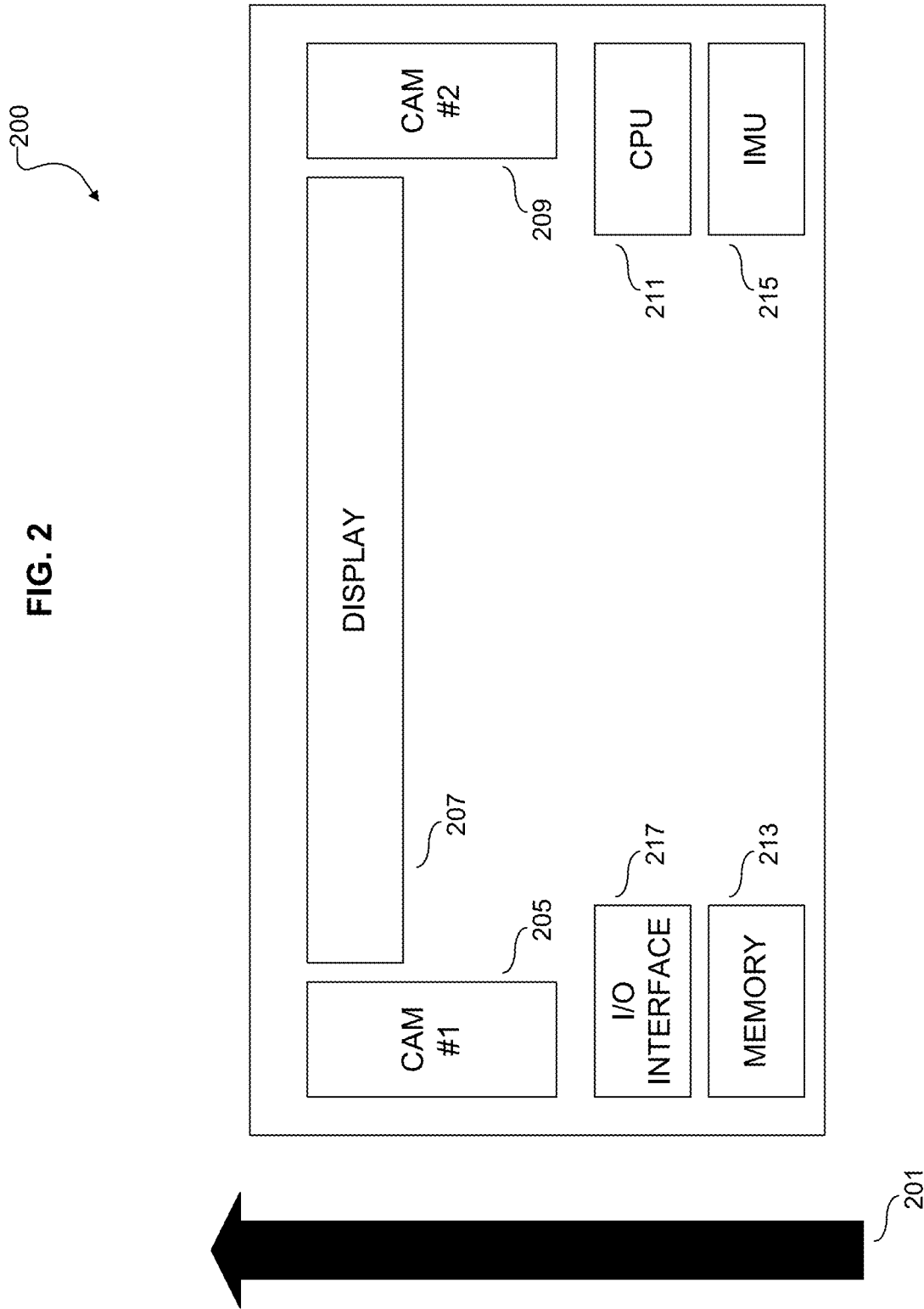
FIG. 2 illustrates an example of an apparatus according to certain embodiments of this disclosure.

FIG. 2 illustrates an example of an augmented reality (AR) apparatus 200 according to one or more embodiments of this disclosure.

According to some embodiments, XR apparatus 200 may operate as an accessory device to another device (for example, a smartphone), which in turn acts as a client device to a host system (for example, device 100 in FIG. 1) which generates and contributes to the rendering of digital objects to be provided as part of an XR experience provided through XR apparatus 200. In some embodiments, XR apparatus 200 comprises a head mounted display (HMD) or pair of smart glasses.

Referring to the non-limiting example of FIG. 2, XR apparatus 200 includes an externally oriented camera 205. For the purposes of explaining this non-limiting example, the arrow 201 is provided. Arrow 201 points externally, towards a field of view away from the direction of projection of an internal-facing display of XR apparatus 200. According to various embodiments, externally oriented camera 205 is an RGB digital video camera (for example, a camera using a CMOS sensor). According to some embodiments, externally oriented camera 205 is a camera capable of detecting light at wavelengths outside the visible range of the human eye (for example, infrared). In certain embodiments, externally oriented camera 205 is a dynamic vision sensor (DVS), which provides an event stream of changes in the intensity of light received at pixels of a sensor of the DVS. In this non-limiting example, externally-oriented camera 205 generates image data, either as an event stream or as discrete image frames, from which planes within the slice of the physical world within the field of view of externally-oriented camera 205 can be recognized and used by one or more XR applications as sites for placing digital objects in an XR experience.

Referring to the non-limiting example of FIG. 2, XR apparatus 200 includes display 207. According to various embodiments, display 207 displays, in an internally-facing direction (e.g., in a direction having a component that is opposite to arrow 201) items of XR content in conjunction with views of objects in an externally-facing field of view. According to some embodiments, display 207 is substantially transparent (similar to, for example, the displays used in "smart glasses" or "heads-up displays" on the cockpit glass of an airplane) and views of objects in externally-facing fields of view come from light passing through display 207. According to various embodiments, (sometimes referred to as "mixed reality") display 207 is opaque, and views of objects in externally-facing fields of view come from image data from externally-oriented cameras (for example, externally-oriented camera 205).

According to various embodiments, XR apparatus 200 includes second camera 209. In some embodiments, second camera 209 is an externally-oriented camera of the same type as externally-oriented camera 205, thereby forming a stereoscopic pair which can generate image data comprising depth estimation. In certain embodiments, second camera 209 is an externally-oriented camera with a different sensor type than externally-oriented camera 205. For example, in some embodiments, to extend battery life and minimize processor usage, externally-oriented camera 205 is a DVS sensor, and second camera 209 is a CMOS type camera, which, while less efficient than a DVS sensor, can provide additional image data (for example, data regarding colors and elements of a scene whose brightness may not change at a level detectable by a DVS sensor) that is useful for object recognition. According to various embodiments, second camera 209 is an internally-facing camera, which tracks the motion of a user's eyes, and by implication, the direction of the user's gaze. Gaze tracking can be used to identify the portions of the field of view the user is actually looking at, thereby assisting placement of XR content, and providing guidance as to where processing and battery resources can be conserved by rendering items of XR content away from a viewer's gaze at lower resolutions.

According to certain embodiments, XR apparatus 200 includes processor 211 and memory 213. In certain embodiments, memory 213 contains program code, which when executed by processor 211, causes XR apparatus 200 to execute an AR application or a computational component of an AR application (for example, detecting planes within a field of view).

Referring to the non-limiting example of FIG. 2, XR apparatus 200 includes an inertial measurement unit 215, which generates location data associated with the motion of XR apparatus 200 along one or more degrees of freedom. In certain embodiments, data output from IMU 215 may be used for positioning (for example, to confirm a geospatial position of XR apparatus 200), or to obtain image stabilization data (for example, data indicating the direction and periodicity of a camera shake) to facilitate object recognition.

In some embodiments, XR apparatus 200 includes input/output interface 217. According to various embodiments, I/O interface 217 provides communicative connectivity between XR apparatus 200 and at least one other electronic device, such as a smartphone, or computer to which XR apparatus 200 is an accessory device. I/O interface is, in certain embodiments, a wireless communication interface, such as a BLUETOOTH transceiver, or communication hardware supporting communications over one or more longer range wireless systems (for example, communication unit 110 in FIG. 1). While, in the example of FIG. 2, depth data is obtained stereoscopically, through parallax changes between first camera 205 and second camera 209, other embodiments are possible and within the contemplated scope of this disclosure. For example, depth data may be obtained using a light detection and ranging (LIDAR) scanner incorporated into XR apparatus 200. In some embodiments, the LIDAR scanner projects a known pattern of points of light (typically, points of light in the infrared spectrum) across a field of view and scans the field of view to identify surfaces upon which the projected points are visible. By modulating or shifting the projection of the pattern across the field of view, and monitoring the changes in which dots are visible, a point cloud of depth data points can be obtained. In certain embodiments, other sensors, such as Time of Flight ("ToF") sensors may be used to obtain depth data.

Figure 3A:
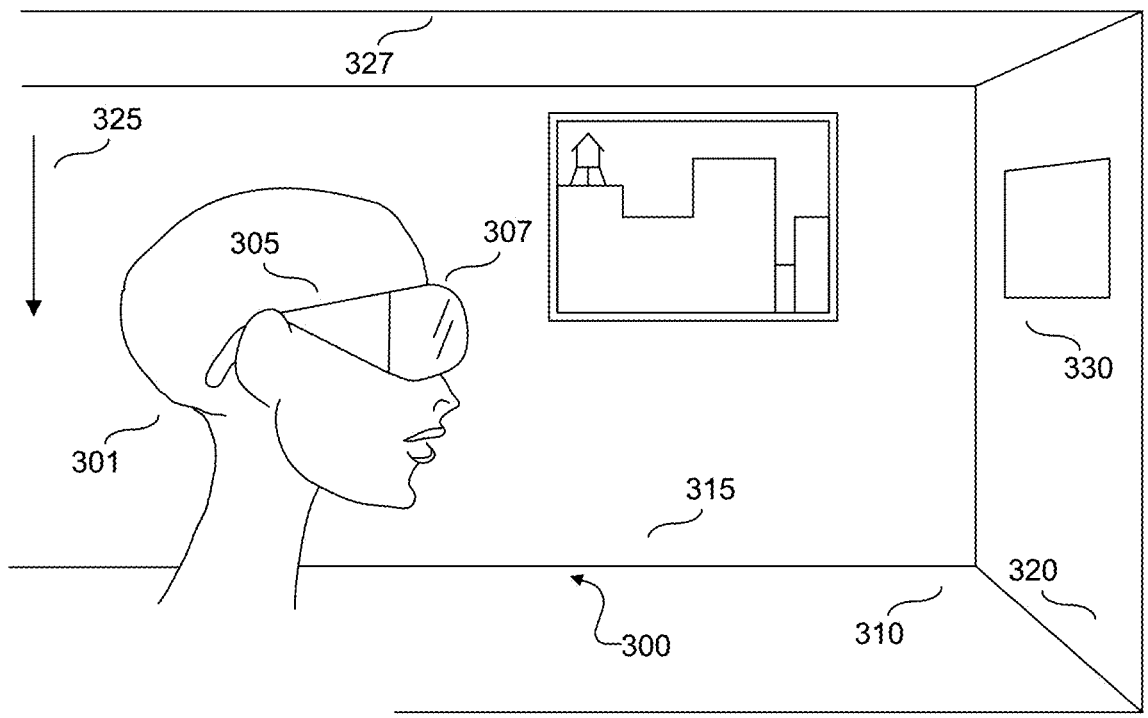
FIGS. 3A and 3B illustrate an example of providing an XR display according to certain embodiments of this disclosure.
Figure 3B:
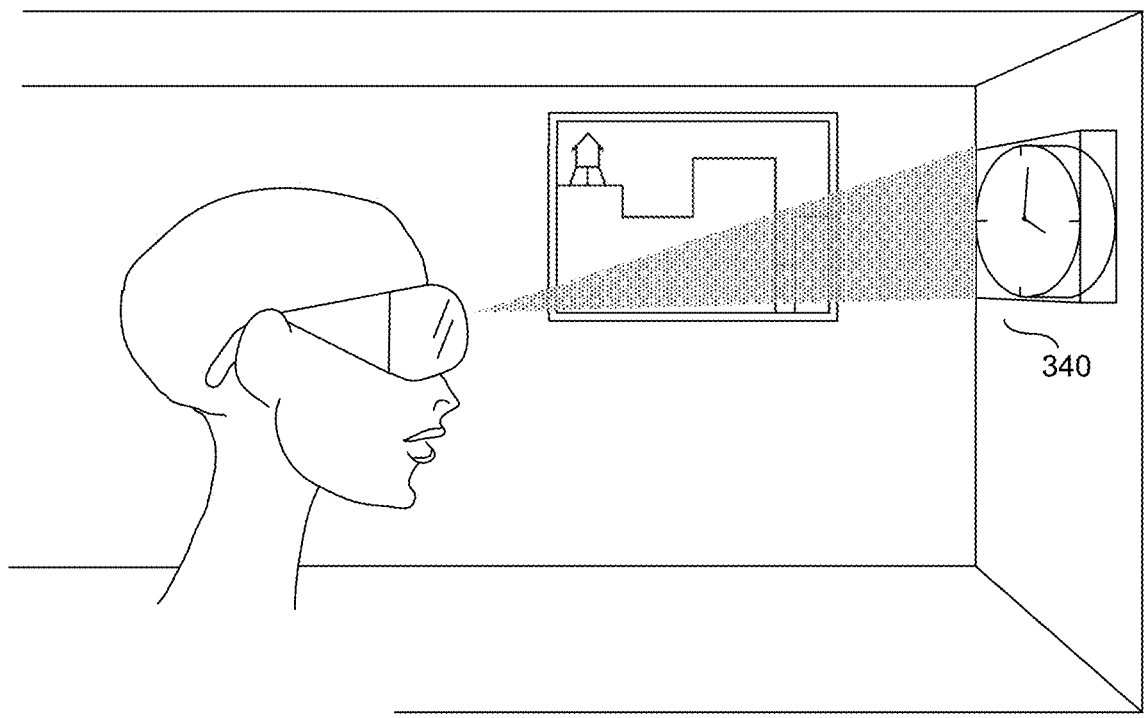

FIGS. 3A and 3B illustrate aspects of the roles of plane detection and space estimation for providing XR experiences at a head-mounted apparatus (for example, XR apparatus 200 in FIG. 2) according to various embodiments of this disclosure. For convenience of cross-reference elements common to both FIGS. 3A and 3B.

In the example shown in FIG. 3A, an operating environment 300 for an XR platform 305 is shown in the top half of the figure. According to certain embodiments, XR platform 305 comprises an untethered head-mounted display (for example, device 100 in FIG. 1) worn on user's 301 head like a pair of sunglasses. In some embodiments, low-power XR platform 305 comprises a clear lens 307 through which user 301 can view objects in operating environment 300, and upon which low-power XR platform 305 can project XR objects, or visual assets, into user 301's field of view to provide an extended reality ("XR") experience. As used in this disclosure, the term "XR experience" encompasses a view of an operating environment, as well as visual assets, or XR objects which are rendered to have the appearance of physical objects within the operating environment, and which, like actual physical objects, appear different when viewed from different viewpoints. As used in this disclosure, the expression "XR" encompasses a variety of digital experiences which incorporate digital objects, which like, physical objects, have a perspective-dependent appearance. As used herein, the expression "XR" encompasses, without limitation, virtual reality (VR), mixed reality (MR), and augmented reality (AR) digital experiences.

In this example, XR platform 305 is a battery powered apparatus worn on the user's head, and as such, is subject to operational constraints beyond those that apply to computing platforms which are handheld or powered from an external power supply (for example, an alternating current outlet of a building). Examples of operational constraints which are particularly applicable to XR platform 305 include weight, and by implication, battery capacity (as most users would prefer not to wear a heavier device with a larger battery), processor consumption and heat buildup (as a worn device, heat buildup from running the processor hard is particularly undesirable), and accurate placement of digital objects relative to physical objects in the XR display (as inaccurate, or unstable placement of digital objects degrades the XR experience, and can cause motion sickness).

For many XR applications, identifying planar surfaces within an operating environment as suitable locations for placing digital objects within the XR display is an integral part of generating the XR display. This is because, in many cases, the extent to which the digital objects and physical objects appear to convincingly interact with each other and obey (at least in part) a common set of physical constraints. For example, for many applications, digital objects placed on horizontal surfaces (for example, a tabletop) are expected to appear to sit on, and within the plane of the physical surface, as "floating" objects or objects which appear to mysteriously cantilever out, or otherwise extend beyond the plane of a physical object look unrealistic and detract from the mixed reality effect provided by an XR display.

In this illustrative example, operating environment 300 is a room, which comprises at least three fixed planar surfaces: floor 310, first wall 315 and second wall 320, each of which are associated with fixed dimensions, and spatial relationships to each other and to a reference direction (for example, the direction of gravity 325). XR platform 305 is executing an application which presents digital objects that appear to sit on the physical surfaces of operating environment 300. To do this, XR platform 305 needs to recognize suitable planar surfaces within operating environment 300. Further, given that, in this example, XR platform 305 is a head-mounted apparatus, efficient identification of one or more suitable planes in operating environment 300 for placing a digital object.

Historically, plane identification for XR applications has been performed by initially identifying and defining all of the planes the full field of view of an XR apparatus, and then selecting a suitable plane from the set of identified planes. According to such approaches, the computationally expensive step of identifying planes from depth and image data is performed without any regard for display parameters (for example, the size and orientation) of the digital object and the physical surfaces the digital object is intended to interact with. Such historical approaches can waste processor and battery resources analyzing depth and image data to identify planes that, by dint of their position within the XR display or other factors are clearly unsuitable for positioning a digital object upon.

As shown in the illustrative example of FIGS. 3A and 3B, the digital object presented by XR platform 305 is a graphic of a clock 340, which has a footprint, or characteristic dimension, represented by coordinate region 330. Rather than processing depth and image data to identify all of the planes within the full field of view of the image and depth sensors of XR platform 305, certain embodiments according to this disclosure only a targeted subset of the available depth and image data to identify planes for placing digital objects, thereby reducing unnecessary processing to identify planes that, by virtue of their location in the field of view, or other properties, are not suitable candidates for positioning a particular digital object. Thus, in the example of FIGS. 3A and 3B, because the digital object is wall clock 340 showing the wearer of XR platform 305 the time, XR platform 305 does not perform plane recognition in portions of the field of view that the wearer is not looking at, or otherwise unsuitable for positioning clock 340. For example, where gaze tracking sensors in XR platform 305 show that user 301 is looking straight ahead, depth and image data from peripheral parts of the field of view of the sensor of XR platform 305, such as ceiling 327 and first wall 315 can be excluded from analysis. Further, where other planes in the scene have been previously recognized and identified (for example, floor 310), as being unsuitable for positioning clock 340 (i.e., wall clocks do not go on the floor), depth and image data from such previously analyzed regions of operating environment 300 can be excluded from the process of identifying a plane suitable for positioning clock 340.

Figure 4A:
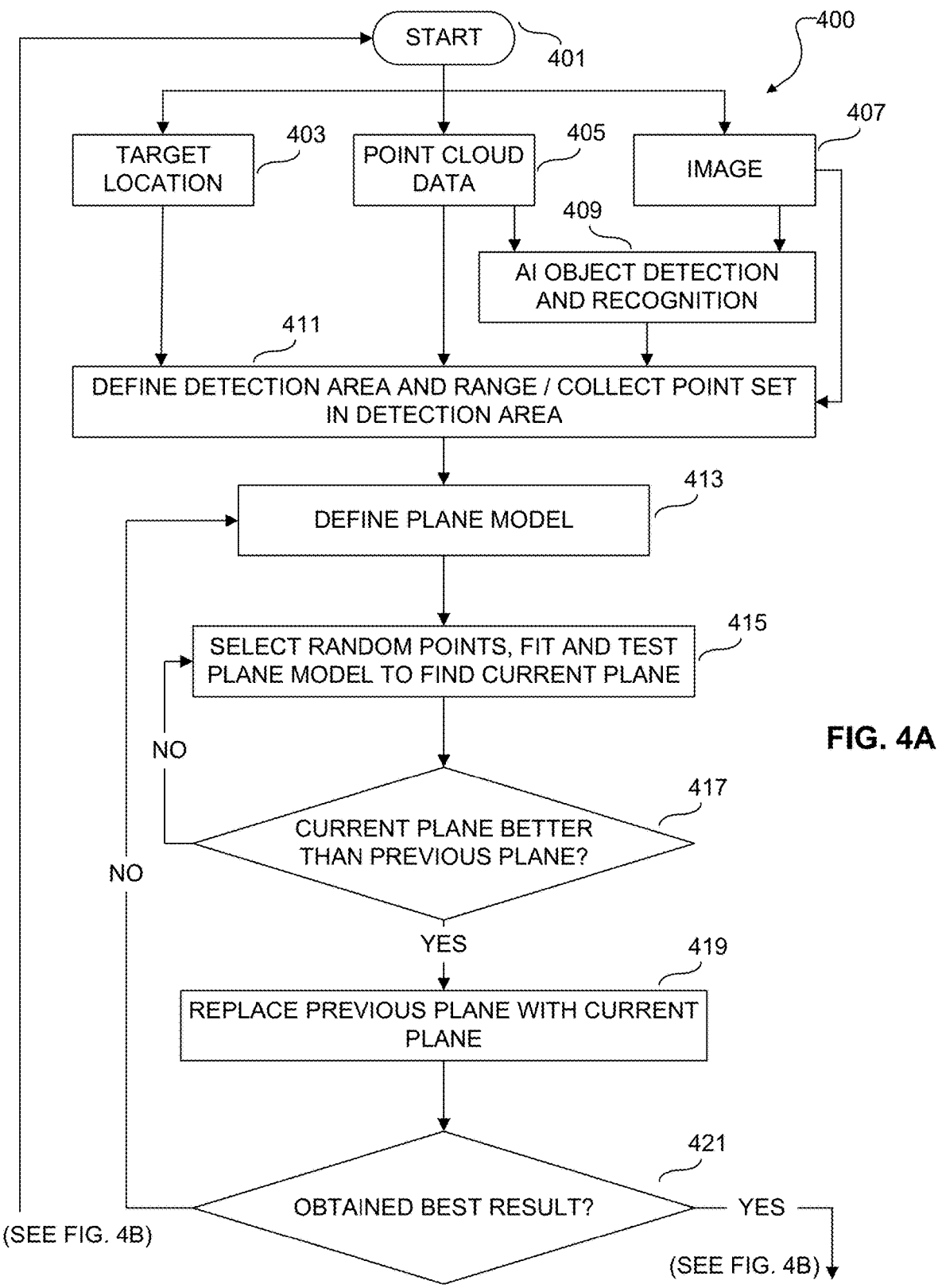
FIGS. 4A and 4B illustrate operations of one example of a method for performing plane detection and space estimation according to certain embodiments of this disclosure.
Figure 4B:
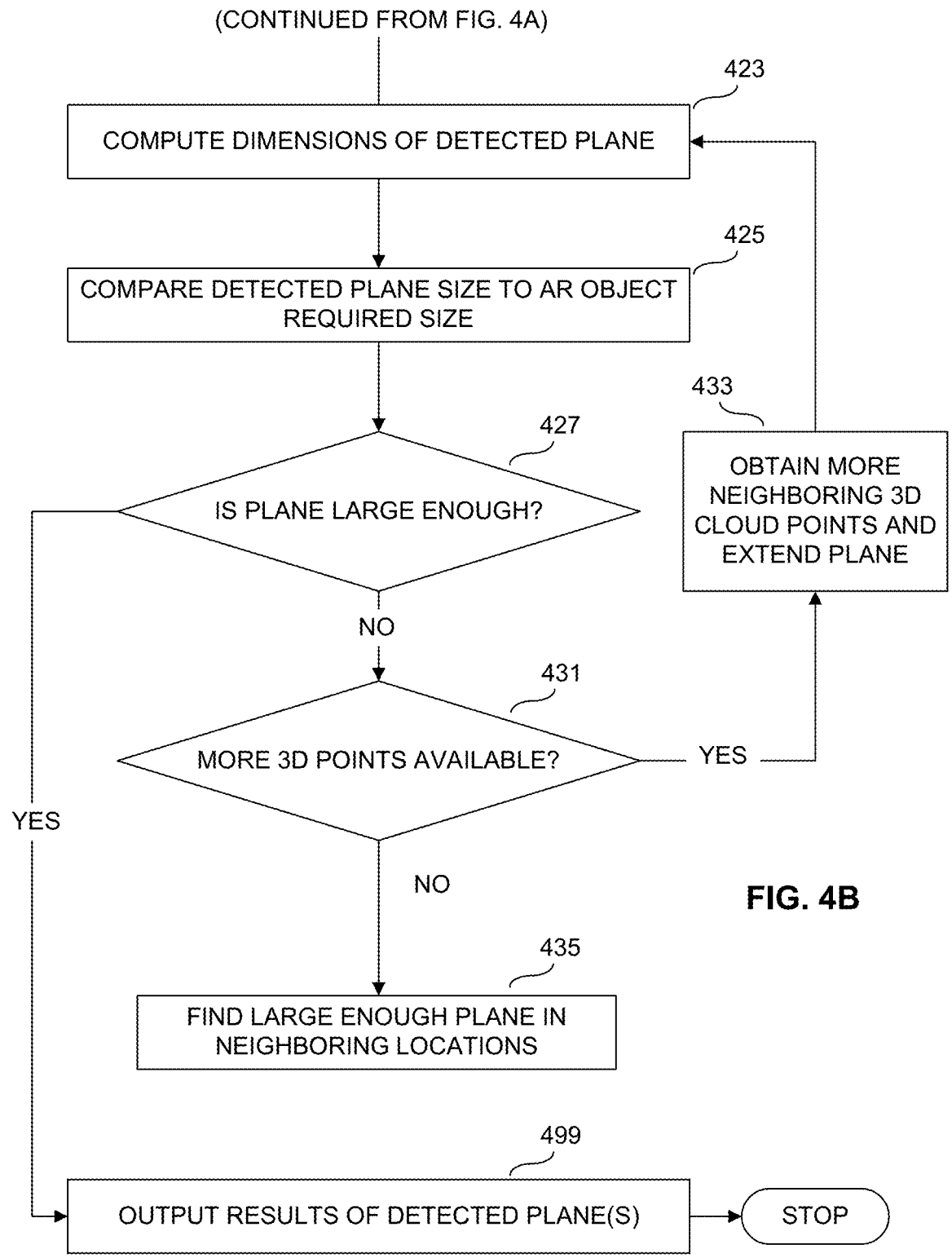

FIGS. 4A and 4B illustrate operations of a method for efficiently identifying suitable XR purpose-specific planes within image and depth data of an operating environment of an XR platform (for example, XR apparatus 200 in FIG. 2, or XR platform 305 in FIG. 3). While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to certain embodiments, methods for identifying suitable XR purpose specific planes comprise at least the following components: (1) plane detection (described with reference to FIG. 4A); and (2) space estimation (described with reference to FIG. 4B). As shown in the figures themselves, certain operations of shown in FIG. 4A proceed to or from operations shown in FIG. 4B.

Referring to the non-limiting example of FIG. 4A, at operation 401, a new iteration of a method 400 for detecting a suitable plane in the operating environment of the XR platform is triggered. According to some embodiments, the iteration of method 400 is triggered due to a program event in an XR application (for example, rendering of a digital object to be positioned on a plane in a view of the operating environment of the XR platform). In some cases, the iteration of method 400 is triggered by the program logic of a previous iteration of method 400, such as when a suitable plane for positioning a digital object was not found in a given subset of the available image/depth data.

At operation 403, a target location for a specific digital object within the field of view of the XR display provided by the XR platform is set. In some embodiments, the target location is set based on a sensor input, such as by tracking the gaze, or direction of view, of a wearer of the XR platform. In such embodiments, the target location may correspond to the portion of the field of view the user's gaze has been tracked as being trained upon. In some embodiments, the target location is set programmatically, based on one or more predefined attributes of the digital object. For example, where the digital object is a representation of something typically found on a floor, the target location based on a prediction of the likely location of the floor in the operating environment. Further, in some embodiments, the target location may be determined based on a specific user input (for example, tracking a user's hand pointing towards a portion of the field of view). In some embodiments, the target location may be set based on an artificial intelligence (AI) prediction or other data-trained machine model. Other embodiments, in which other mechanisms for setting a portion of the field of view as a target location are used, are possible and within the contemplated scope of this disclosure.

At operation 405, point cloud data is obtained, wherein the point cloud data comprises a plurality of data points, wherein each data point associates a coordinate within the field of view of the XR platform with a measured depth value of a surface within the operating environment. According to some embodiments, the point cloud is generated using a combination of visual whose outputs are fed to a visual simultaneous location and mapping (v-SLAM) pipeline. In some embodiments, the depth data is obtained using a LIDAR scanner or time-of-flight sensor.

At operation 407, image data (for example, the output of a CMOS image sensor) of the field of view of the XR platform is obtained. According to certain embodiments, the image data associates coordinate locations (for example, individual pixels) with values in a color space. While it is not necessary that the field of view of the sensor(s) providing the point cloud data and the image data be perfectly coextensive, in many embodiments, there is significant overlap in the portions of a scene (i.e., the portion of an operating environment the XR apparatus is trained upon) that are within the field of view of the sensor(s) providing the point cloud data and the sensor(s) providing the image data. Further, in many embodiments, the target location set at operation 403 is situated within a region of overlap between the collected point cloud data and the image data.

Referring to the non-limiting example of FIG. 4A, in certain embodiments, the XR uses artificial intelligence (AI) or otherwise applies a data-trained model to determine if there are any recognizable objects within the shared field of view of the sensors providing the image data and the depth data. In some embodiments, the XR platform performs object recognition based on features detected using a binary robust invariant scalable keypoint ("BRISK") algorithm. Given the significant advances in recognizing objects within image and/or depth data in a computationally efficient manner, candidate regions for plane detection within the shared field of view of the image and depth sensor that are categorically unsuitable for positioning digital can be identified and excluded from further analysis. As an illustrative example, consider a case in which, in addition to the surfaces shown in FIG. 3A operating environment 300 further contained a person standing near a wall. By recognizing the person, the area of the field of view containing the person could be excluded as a candidate for positioning clock 340, because wall clocks are mounted on walls, rather than on persons.

At operation 411, the XR platform defines a plane detection area based on the previously target location, the point cloud data, and the image data, and where applicable, identification of objects at operation 409. According to certain embodiments, the plane detection area comprises a spatially defined subset of the scene data. As an illustrative example of a spatially defined subset of the scene data, the shared field of view of the image and depth sensors may be divided into quadrants, of which one quadrant is selected as the plane detection area. In some embodiments, as an alternative to selecting from a predetermined region within the common field of view of the image and depth sensors, the size and location of the plane detection area may be determined programmatically, for example, by setting the target location as the center or centroid of an area satisfying one or more predefined constraints. As a non-limiting example of constraints defining the size of a plane detection area surrounding a target point, a dimension (for example, the width or height) of a plane detection area may be given by equation 1, below:

$$L_{pd} = \frac{L_{do}}{(L_{FOV} \times D_{pc})} \quad (1)$$

where $L_{pd}$ is a dimension of the plane detection area along a given axis (for example, the x or y axis), expressed as a fraction of the dimensions of the shared field of view of the image and depth sensors. $L_{do}$ is a dimension of the digital object to be placed on a plane in the plane detection area along the given axis, and $D_{pc}$ is a quantification of the density of the point cloud data in area around the target location. As shown above, where the digital object is small, and by implication, the value of $L_{do}$ is small, the size of the plane detection area is reduced. Similarly, where the digital object is large, the size of the plane detection area is increased, as larger objects require larger planes to be positioned on. Further, and as shown above, where there is abundant depth data (i.e., a dense point cloud of depth data), the size of plane detection area is reduced. Similarly, where the depth data is sparse, the size of the plane detection area is increased.

Having defined a plane detection area, at operation 411, the XR platform also collects a point set in the plane detection area. According to some embodiments, the collected point set comprises three or more points of the point cloud selected from within the detection area.

At operation 413, the XR platform defines an initial plane model based on the point set collected at operation 411. In certain embodiments, the plane model is a vector representation of a plane, wherein the origin of the vector comprises a point in the plane, and the vector defines the normal to the plane. According to certain embodiments, defining the plane model at operation 413 is a plane hypothesis, and constitutes the first step of an iteration of a random sample consensus ("RANSAC") process of identifying the best available plane in the plane detection area. RANSAC has been shown to be effective method for defining planes from noisy, or potentially noisy data sets.

At operation 415, the XR platform randomly selects points within the plane detection area, fits a plane model to the randomly selected points, and tests the hypothesis plane model defined at operation 413 against the plane fitted to the randomly selected points. At block 417, the XR platform determines whether the hypothesis plane model defined at operation 413 better than the plane generated at operation 415. Where the plane generated based on random points at operation 415 is not better than the hypothesis plane generated at operation 413 (i.e., the "NO" branch of block 417), method 400 loops back to operation 415, to determine if a better plane can be obtained from other randomly selected points in the plane detection area. Where the plane generated based on randomly selected points at operation 415 is better than the hypothesis plane defined at operation 413 (i.e., the "YES" branch of block 417), method 400 proceeds to operation 419, wherein the plane generated at operation replaces the plane model defined at operation 413 as the hypothesis plane.

Subsequent to operation 419, method 400 proceeds to block 421, wherein the XR platform determines whether the current hypothesis plane constitutes a best available plane. According to certain embodiments, the determination of whether the current hypothesis plane is based on one or more of the following factors: a number of prior iterations of operations 413 through 419, a time limit for processing time for plane identification (i.e., to avoid slowing down the frame rate of the XR display due to tricky plane identification scenarios), or a quantification of the fit between the current hypothesis plane exceeding a threshold value.

If, at block 421, the XR platform determines that the criteria for a best result have been satisfied (i.e., the "YES" branch of block 421), method 400 proceeds from performing operations directed to plane detection (i.e., accurately identifying a plane in the operational environment as recorded by the depth and image data) to operations directed to space estimation (i.e., determining whether the detected plane is of sufficient size for positioning the digital object on), as described with reference to FIG. 4B, starting with operation 423.

If, at block 421, the XR platform determines that the criteria for a best plane have not been satisfied, method 400 loops back to operation 413, where a new hypothesis plane model is defined.

As noted previously, the RANSAC methodology for determining a plane is well-suited for noisy data sets. However, in cases where the depth data is either sparse and/or noisy, numerous iterations of operations 413 through 421 may be required before a plane corresponding to best result is obtained. By limiting the data set upon which an iterative search for the best plane is performed to just a spatially bounded subset of a point cloud, certain embodiments according to this disclosure can effect significant improvements in computational efficiency and consumption of battery resources by, for example, avoiding extensive plane detection cycles from locations within the point cloud that are generally unsuitable for positioning the digital object.

Referring to the non-limiting example of FIG. 4B, upon completion of the plane detection portion (shown with reference to FIG. 4A), method 400 proceeds to space estimation, wherein the XR determines whether the detected plane extends far enough to correctly position the digital object. As noted elsewhere in this disclosure, an often-important dimension of the performance of an XR platform is the extent to which digital objects appear (or can appear) to be bound by the spatial and physical constraints (for example, gravity) of physical objects in the operating environment. For many applications, positioning digital objects in a way that appears to arbitrarily ignore such physical constraints (for example, by extending significantly beyond the plane of the supporting surface, or appearing to "swallow" objects on a supporting surface) looks unnatural and detracts from the XR experience.

According to various embodiments, at operation 423, the XR platform begins the process of performing space estimation by computing the currently known dimensions of the plane based on the point cloud data points used to detect the plane. For the purposes of computational efficiency, the currently known dimensions of the plane computed at operation 423 are typically not coextensive with the boundaries of the plane. Rather, the currently known dimensions of the plane are determined by the spatial distribution of the data points of the point cloud from which the plane was determined. In this way, certain embodiments according to this disclosure strive to analyze scene data (or depth and image area of the operating environment) only as necessary for the limited purpose of correctly positioning digital objects, thereby avoiding wasted processing cycles processing identifiably unnecessary data.

As shown in the illustrative example of FIG. 4B, at operation 425, the XR platform compares the computed size of the plane to the required size of the digital object. According to some embodiments, at operation 425, the XR platform compares at least one value of a useable size of the plane (for example, the shortest diagonal of the plane) to at least one value of a characteristic size of the digital object (for example, a diameter, or longest diagonal) to determine compare the size of the computed plane against the size of the digital object. Through judicious selected of characteristic dimensions of the plane and digital object, unnecessary processing to calculate the precise area of the plane or object can be avoided, thereby improving processing speed and conserving battery resources.

At block 427, the XR platform proceeds according to the determination whether computed size of the plane is larger than the required size of the digital object. When the computed size of the plane is determined to be equal to or larger than the required size of the digital object (i.e., the "YES" branch of block 427) method 400 proceeds to operation 499, wherein the result of the plane detection and space estimation operations is output to one or more applications executing on the XR platform. According to certain embodiments, the result of the plane detection and space estimation is output in a vector format to an XR application, which renders an XR display in which the digital object is positioned on the detected plane.

As shown in the explanatory example of FIG. 4B, when the computed size of the plane is determined to be smaller than the required size of the digital object (i.e., the "NO" branch of block 427, method 400 proceeds to block 431, wherein the XR platform determines whether there are additional point cloud data points within the plane detection area defined at operation 411. In other words, in response to determining that the plane as currently defined is not large enough to correctly position the digital object, certain embodiments according to this disclosure look for additional data points to support increasing the known size of the plane.

Where there are more depth cloud data points in the current plane detection area (i.e., the "YES" branch of block 427), method 400 proceeds to operation 433, where the XR platform obtains point cloud data points neighboring the current plane and tests to see if the additional point cloud data points fit the detected plane. Where there are additional point cloud data points within the plane, the detected plane is extended to include the additional point cloud points, and method 400 loops back to operation 423. In certain embodiments, multiple iterations of operations 423 through 433 may be required before the detected plane is extended to the point where it is large enough to accommodate the digital object.

Where there are no more depth cloud data points in the current plane detection area (i.e., the "NO" branch of block 427), method 400 proceeds to operation 435, wherein method 400 is restarted in a new plane detection area.

FIGS. 5A through 5E provide a visualization of aspects of plane detection and space estimation according to certain embodiments of this disclosure. The embodiments shown in FIGS. 5A through 5E are for illustration only and other embodiments could be used without departing from the scope of the present disclosure. For convenience of cross-reference, elements common to more than one of FIGS. 5A through 5E are numbered similarly.

Figure 5A:
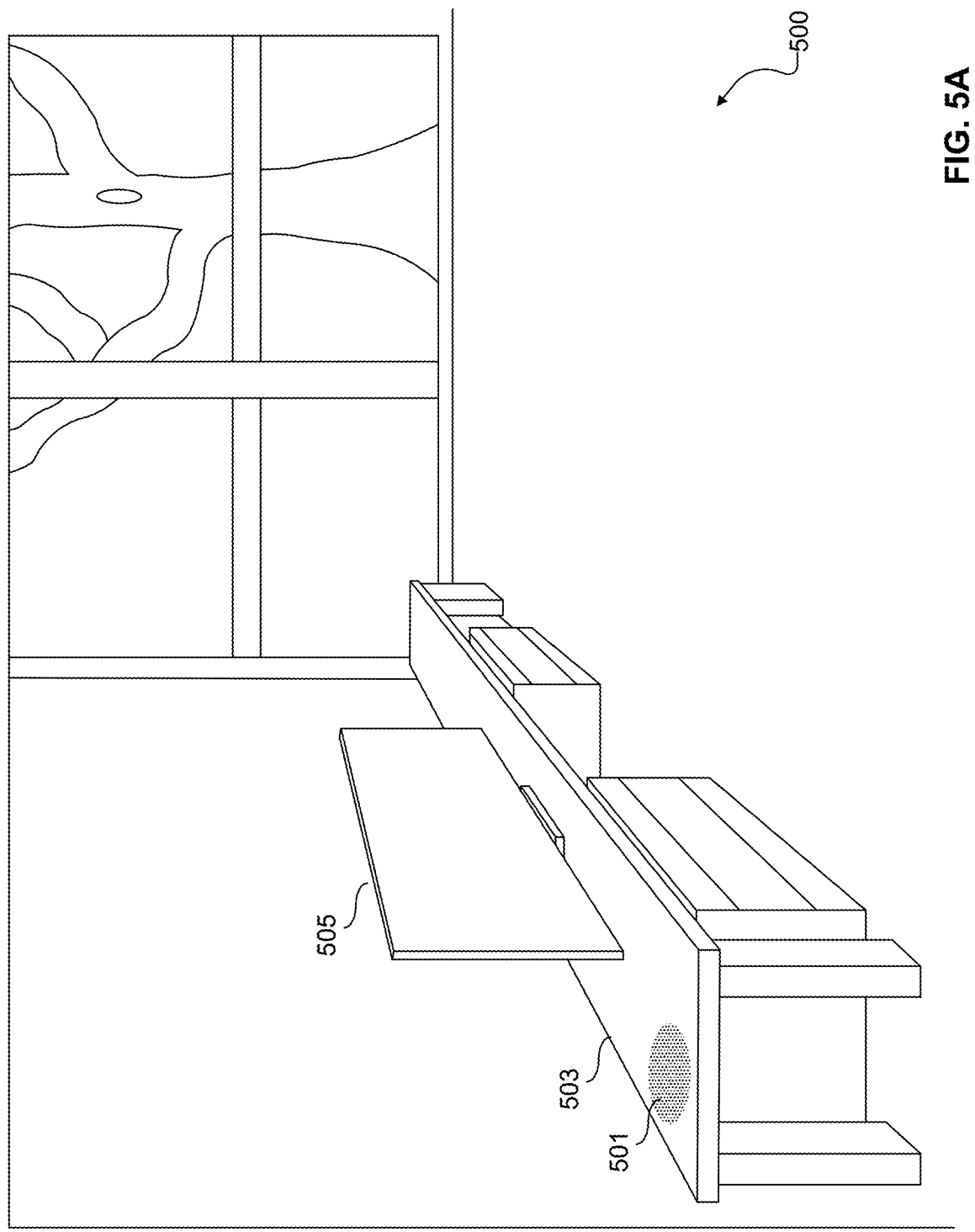

Referring to the non-limiting example of FIG. 5A, a scene 500 comprising a portion of an operating environment of an XR platform (for example, device 100 in FIG. 1, XR apparatus 200 in FIG. 2, or XR platform 305 in FIG. 3A) is shown in the figure. As used in this disclosure, the expression "scene" encompasses a portion of an operating environment within the shared fields of view of one or more image sensors and one or more depth sensors of the XR platform. Put more simply, as used herein, the term "scene"

comprises a view of a portion of an environment in which digital objects can be positioned on planes determined according to the systems and methods of this disclosure.

In the illustrative example of FIGS. 5A-5E, the XR platform seeks to find a planar surface upon which to position a digital object comprising a representation of a small vessel (for example, a coffee cup) within scene 500. Unlike humans, whose brains can readily form persistent semantic connections between image information from the eyes and the three-dimensional properties of recognized objects (i.e., "I see a table. The top of a table is a flat surface upon which I can place objects"), XR platforms typically need to continuously process the image and depth data of their operating environments to understand the three-dimensional properties of their environments to know, for example, that region 501 of table 503 is a suitable place upon which to position a vessel. This same capacity to rapidly invoke connections between visual information and previously formed connections regarding the three-dimensional properties of objects also allows humans to rapidly exclude areas of scene 500 (for example, the top of flatscreen display 505 that are poor candidates for positioning the vessel.

By contrast, a processor-based apparatus does not rely on triggering pretrained connections between what they see and how they can interact with objects, and instead typically compute an understanding of the three-dimensional operating environment represented in image and depth data provided to the processor. To determine where to position a digital object, such as the aforementioned small vessel, XR platforms typically need to, without limitation, specifically process depth data points to identify the planes within a point cloud of depth data points. Depending on the scene and density of the point cloud, identifying planes within a scene may be computationally very expensive.

Figure 5B:
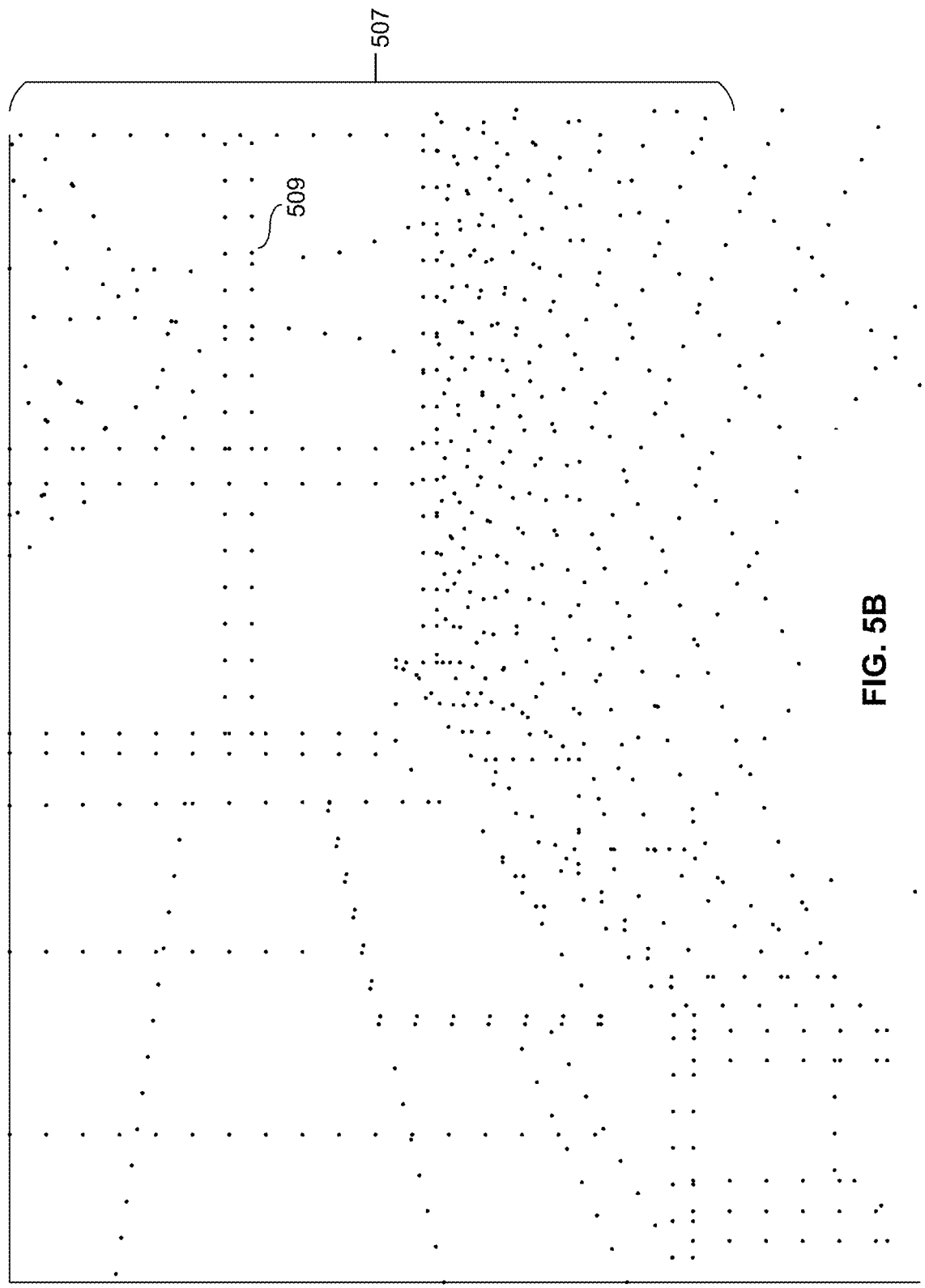
Figure 5E:
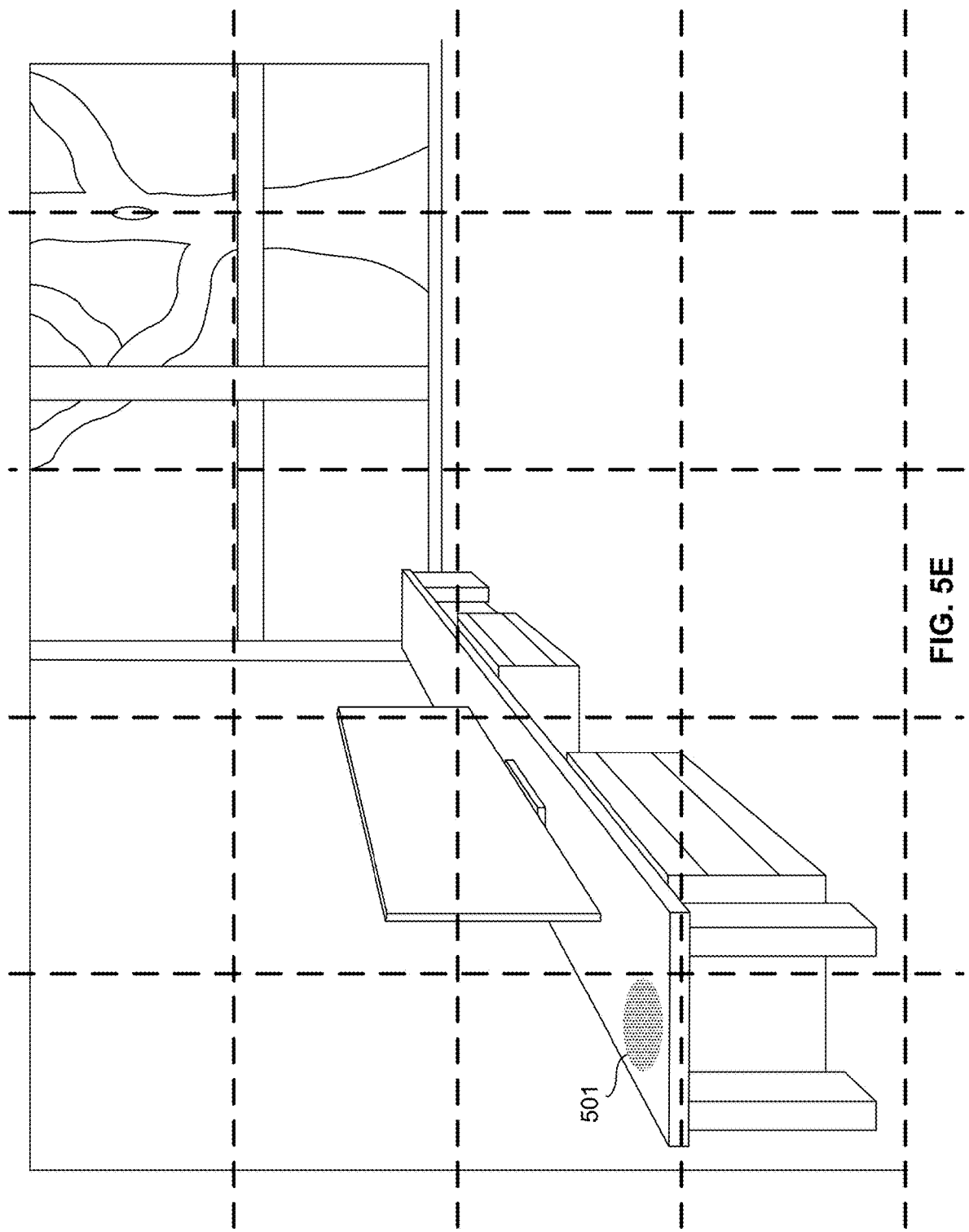

Referring to the non-limiting example of FIG. 5B, a visualization of a point cloud 507 of depth data points recorded across scene 500 is shown. Each depth point (for example, depth point 509) is a datum associating a coordinate or location within the scene with a measured distance from the XR platform to the physical object at that scene. To identify planes within point cloud 507, the processor applies a RANSAC or other methodology which iteratively selects points of point cloud 507, fits and tests planes to sets of data points.

FIG. 5C illustrates a set of planes 511 within scene 500 identified by iteratively processing sets of points within point cloud 507. Depending on, for example, the number of planes to be identified and the density and noisiness of point cloud 507, identifying all of the planes within the point cloud can take many, many processing iterations. Further, because XR platforms are often not configured to, or otherwise capable of maintaining a persistent map of the location of the planes in the operating environment, the computational load associated with identifying planes that are irrelevant to tasks at hand (for example, in the hypothetical of finding a location within scene 500 for positioning a small vessel, identifying the plane 513 of the window in the room is irrelevant to the task at hand) is further increased by having to recalculate the position of such planes. Where processor and battery resources are limited, repeated processing and reprocessing of point cloud data to identify planes of no immediate use to the XR platform can significantly reduce performance across multiple dimensions, such as battery life and frame rate.

Referring to the non-limiting example of FIG. 5D, certain embodiments according to the present disclosure foster significant efficiency gains in detecting planes in a point cloud of depth data by judiciously curtailing the set of depth data points over which plane detection is performed. Instead of performing plane detection across all of the points of point cloud 507, XR platforms according to certain embodiments of this disclosure perform plane detection and space estimation over a spatially defined (for example, at operation 411 in FIG. 4A) plane detection area that comprises a subset of the depth points of point cloud 507 that is more likely to provide a suitable plane for positioning a digital object. All other things being equal, processing fewer points of the point cloud translates directly to less processing overall.

According to some embodiments, the plane detection area is defined as comprising one or more predefined slices of the scene. In the illustrative example of FIG. 5D, scene 500 is partitioned into twenty-five (25) sections, only two of which are selected to define plane detection area 517. As visualized by the explanatory example of FIG. 5E, which shows region 501 positioned within scene 500, determining initial constraints on the data to be processed which exclude foreseeably irrelevant areas of the scene, XR apparatus according to certain embodiments of this disclosure are able to close some of the gap in terms of the efficiency with which they obtain a functional understanding of visual data of a scene.

Figure 6:
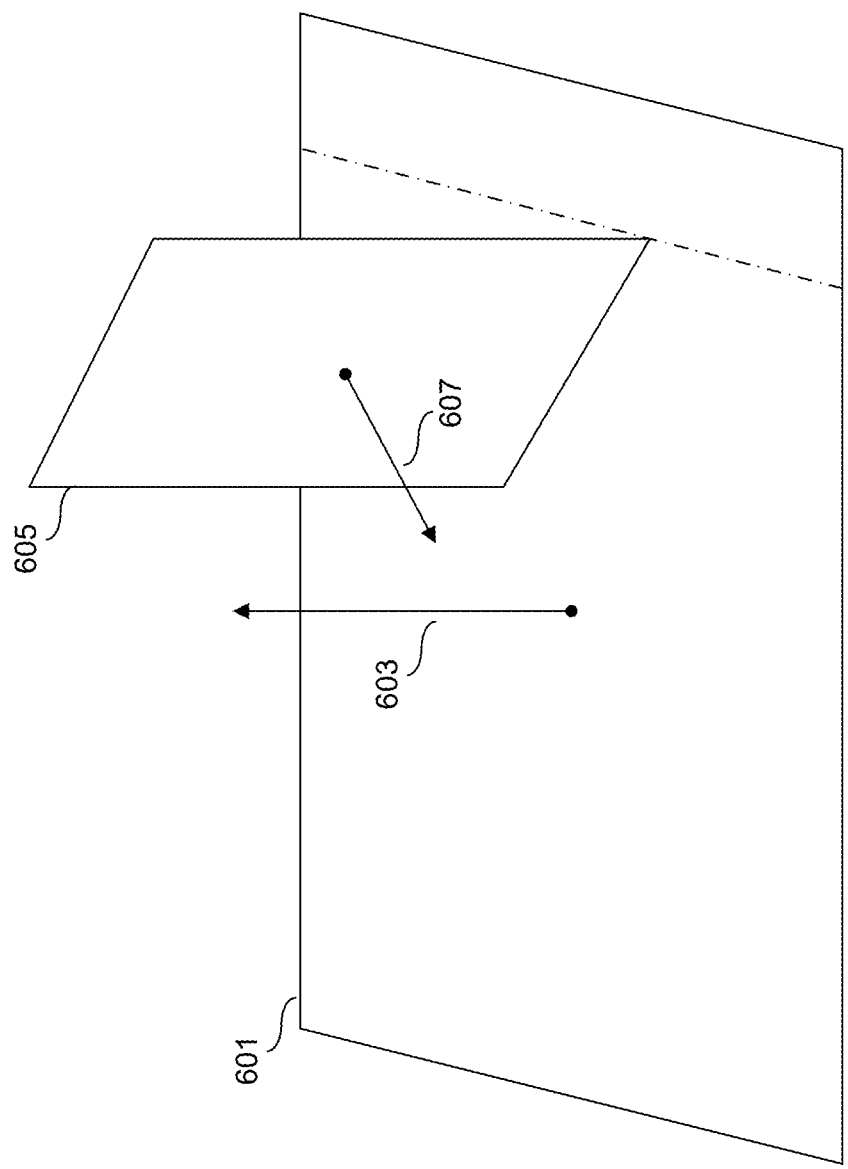
FIG. 6 illustrates an example of leveraging detection of a first plane to improve the efficiency of detecting an adjacent plane according to certain embodiments of this disclosure.

FIG. 6 illustrates an example of how apparatus and methods according to some embodiments of this disclosure can foster further efficiency gains in plane detection and size estimation. Although the present disclosure has thus far focused on embodiments involving detection and definition of a plane suitable for a function of an XR application (for example, positioning a digital object in an XR display) in depth data of a scene, in which depth and image of the scene are the primary inputs to the process of plane recognition, the present disclosure is not so limited. According to some embodiments, the result of a first plane detection and size estimation operation can be leveraged to improve the efficiency of a second plane detection and size estimation operation.

Referring to the non-limiting example of FIG. 6, a first plane 601 is shown in the figure. In this example, first plane 601 represents the output of a previous iteration of a plane detection method (for example, method 400 in FIGS. 4A and 4B) applied to depth data of a scene. As shown in the figure, first plane 601 may be represented by first vector 603, whose origin comprises a point within first plane 601 and whose direction defines the normal of the plane.

While it is possible that an XR application may only need to detect a single plane in a scene, for some applications, two or more planes may need to be detected. Indeed, in some cases, all of the planes in the scene may need to be detected. Certain embodiments according to this disclosure can facilitate the detection of multiple (or all of the planes in a scene) planes by using one or more previously detected plane to set a target location (for example, at operation 403 in FIG. 4A), define a detection area (for example at operation 411 in FIG. 4A) or constrain the parameters of a hypothesis plane model (for example, at operation 413). In this way, certain embodiments can identify further planes of interest while still limiting the volume of depth data to be processed.

Referring to the non-limiting example of FIG. 6, the properties of detected first plane 601 can be used to facilitate the detection of second plane 605 in a number of ways. In a first example, suppose the digital object to be placed in the XR display is an image of an object that, in the physical world, simultaneously touches a vertical plane and an adjacent horizontal plane (for example, a ladder). In this example, the nature of the digital object to be placed in the XR display dictates certain parameters of second plane 605, namely that, second plane 605 needs to touch first plane 601, and that second normal vector 607 representing second plane 605 needs to be perpendicular to first vector 603. In this way, the plane detection area can be set based on the neighborhood of first plane 601, and the range of possible plane models is constrained to just plane models based on a second normal vector 607 which is perpendicular to first vector 603.

In some embodiments, the method of leveraging a first detected plane to detect a second plane satisfying one or more expected conditions described with reference to FIG. 6 can be iterated and extended to identify all of the planes in a scene more efficiently than by simply processing a full point cloud. As one non-limiting example, an understanding of all of the planes in a scene can be generated by detecting the plane of the floor in a scene and then detecting all of the planes connected to the floor plane, and the planes connected thereto. By this approach, almost all of the planes in most scenes (excluding scenes of operating environments with numerous self-supporting objects such as drones and helium-filled balloons) can be detected, as gravity requires that non-flying objects be connected either directly, or indirectly, through one or more planes of supporting objects to the floor plane.

FIG. 7 describes operations of a method 700 for performing plane detection and space estimation according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The operations described with reference to method 700 can be performed, without limitation, at an XR platform capable of obtaining depth and image data (for example, device 100 in FIG. 1, XR apparatus 200 in FIG. 2, or XR platform 305 in FIG. 3A). Other hardware configurations, such as configurations in which certain processing steps are performed at a separate platform (for example, a smartphone) and data is relayed to and from a viewing device worn by a user, are possible, and within the contemplated scope of this disclosure.

Referring to the non-limiting example of FIG. 7, at operation 705, a processor (for example, main processor 140 in FIG. 1 or processor 211 in FIG. 2) obtains scene data. According to certain embodiments, the obtained scene data comprises image data associating coordinates within a field of view of a visual sensor (for example, a CMOS sensor) of an XR apparatus with values in a color space. In some embodiments, the depth data comprises a point cloud of data points associating coordinates in a portion of field of view of a depth sensor overlapping with a portion of a field of view of the sensor(s) generating image data, with distances from the depth sensor (for example, a LIDAR scanner).

According to some embodiments, at operation 710, the processor defines a first detection area, comprising a spatially defined subset of the scene data (for example, a bounded area within the shared fields of view of the depth sensor and the image sensor). At a high level, by setting the first detection area, the processor cuts down the volume of data to be processed to find a plane suitable for a requirement of an XR application (for example, a plane having the correct orientation and size to position a digital object). In some embodiments, the first detection area is defined based at least on a set target location (for example, a location set at operation 403 in FIG. 4A. In some embodiments, AI-based object recognition is performed to identify some or all of the objects in the scene, in order to rule out portions of the scene data that are not candidates for inclusion in the first detection area.

As shown in the illustrative example of FIG. 7, at operation 715, the processor defines a plane model (for example, the plane defined at operation 413 in FIG. 4A) based on depth data points within the first detection area. According to some embodiments, the plane model is defined according to certain constraints, such as a range of angles for a normal vector of the plane, to ensure parallelism or perpendicularity with one or more previously detected planes.

According to various embodiments, at operation 720, the processor defines a plane (for example, the plane found at operation 415 in FIG. 4A) based on the plane model. In some embodiments, defining a plane at operation 720 comprises performing multiple iterations of a sample and refinement process (for example, RANSAC) to revise an initial plane hypothesis to best fit the available depth data in the first detection area.

Referring to the non-limiting example of FIG. 7, at operation 725, the processor determines at least one value of a usable size of the defined plane. According to some embodiments, the usable size corresponds to a smallest value of a characteristic dimension (for example, length, width or diameter) of the detected plane. According to some embodiments, the at least one value of the usable size is a product or composite of multiple dimensional values (for example, an estimation of the area of the plane).

Referring to the illustrative example of FIG. 7, at operation 730, the processor compares at least one value of a characteristic size of a digital object to the at least one value of the usable size of the plane. According to certain embodiments, the value of the characteristic size of the object corresponds to a smallest value of a characteristic dimension (for example, a length, width or diameter) of the digital object. Put simply, in certain embodiments, at operation 730, the processor performs a determination of whether the currently defined plane provides enough space for positioning the digital object.

According to various embodiments, at operation 735, responsive to determining that the at least one value of the usable size of the plane is greater than the at least one value of the characteristic size of the digital object, the processor generates an XR display utilizing the digital object and the detected plane. In some embodiments, the digital object is positioned in an area of image data in the XR display corresponding to the detected plane.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method, comprising:
   obtaining scene data, wherein the scene data comprises image data of a scene and depth data of the scene, the depth data comprising depth measurement values of points of a point cloud;
   defining a first detection area, wherein the first detection area comprises a spatially defined subset of the scene data of a size based on a characteristic size of a digital object;
   defining a plane model based on points of the point cloud within the first detection area;

defining a plane based on the plane model; and
iteratively expanding the plane based on a subset of points of the point cloud, wherein each iteration of expanding the plane comprises:
 determining at least one value of a usable size of the plane based on the subset of points of the point cloud;
 comparing at least one value of the characteristic size of the digital object to the at least one value of the usable size of the plane; and
 one of:
  responsive to determining that the at least one value of the characteristic size of the digital object is greater than the at least one value of the usable size of the plane, expanding the subset of points of the point cloud for a subsequent iteration of expanding the plane; or
  responsive to determining that the at least one value of the characteristic size of the digital object is less than the at least one value of the usable size of the plane, generating a display comprising the digital object positioned upon the plane based on the plane model.

2. The method of claim 1, further comprising:
receiving a target location; and
defining the first detection area based on the target location and the depth data.

3. The method of claim 2, further comprising:
performing object detection and recognition of the scene based on at least one of the image data or the depth data to obtain an object recognition result; and
defining the first detection area based at least in part on the object recognition result.

4. The method of claim 1, wherein defining the plane model comprises:
defining a first plane model based on a first set of points of the point cloud;
randomly selecting one or more points of the point cloud;
defining a second plane model based at least in part on the randomly selected one or more points of the point cloud;
comparing a fit of the first plane model to the first set of points of the point cloud and the randomly selected one or more points of the point cloud to a fit of the second plane model to the first set of points and the randomly selected one or more points of the point cloud; and
responsive to determining that the fit of the second plane model is better than the fit of the first plane model, defining the second plane model as the plane model.

5. The method of claim 1, further comprising:
determining that the at least one value of the characteristic size of the digital object is greater than the at least one value of the usable size of the plane;
responsive to determining that the at least one value of the characteristic size of the digital object is greater than the at least one value of the usable size of the plane, determining whether the first detection area comprises additional points of the point cloud;
responsive to determining that the first detection area does not comprise additional points of the point cloud, defining a second detection area, wherein the second detection area comprises a second spatially defined subset of the scene data;
defining a second plane model based on points of the point cloud within the second detection area;
defining a second plane based on the second plane model;
determining at least one value of a usable size of the second plane based on points of the point cloud;
comparing the at least one value of the characteristic size of the digital object to the at least one value of the usable size of the second plane; and
responsive to determining that the at least one value of the characteristic size of the digital object is less than the at least one value of the usable size of the second plane, generating a display comprising the digital object positioned upon the second plane based on the second plane model.

6. The method of claim 1, wherein the first detection area is defined based on at least one of: a field of view of a sensor providing the image data, a field of view of a sensor providing the depth data, or a point density of the point cloud.

7. The method of claim 1, wherein the plane model is determined based on a random sample consensus analysis of the points of the point cloud within the first detection area.

8. An apparatus, comprising:
a processor;
an image sensor;
a depth sensor; and
a memory containing instructions that, when executed by the processor, cause the apparatus to:
 obtain scene data, wherein the scene data comprises image data of a scene from the image sensor and depth data of the scene from the depth sensor, the depth data comprising depth measurement values of points of a point cloud,
 define a first detection area, wherein the first detection area comprises a spatially defined subset of the scene data of a size based on a characteristic size of a digital object,
 define a plane model based on points of the point cloud within the first detection area,
 define a plane based on the plane model, and
 iteratively expand the plane based on a subset of points of the point cloud, wherein, in each iteration of expanding the plane, the processor executes instructions that cause the apparatus to:
  determine at least one value of a usable size of the plane based on the subset of points of the point cloud,
  compare at least one value of the characteristic size of the digital object to the at least one value of the usable size of the plane, and
  one of:
   responsive to determining that the at least one value of the characteristic size of the digital object is greater than the at least one value of the usable size of the plane, expand the subset of points of the point cloud for a subsequent iteration of expanding the plane, or
   responsive to determining that the at least one value of the characteristic size of the digital object is less than the at least one value of the usable size of the plane, generate a display comprising the digital object positioned upon the plane based on the plane model.

9. The apparatus of claim 8, wherein the memory further contains instructions that, when executed by the processor, cause the apparatus to:
receive a target location, and
define the first detection area based on the target location and the depth data.

10. The apparatus of claim 9, wherein the memory further contains instructions that, when executed by the processor, cause the apparatus to:
- perform object detection and recognition of the scene based on at least one of the image data or the depth data to obtain an object recognition result, and
- define the first detection area based at least in part on the object recognition result.

11. The apparatus of claim 8, wherein the instructions that, when executed by the processor, cause the apparatus to define the plane model comprise instructions that, when executed by the processor, cause the apparatus to:
- define a first plane model based on a first set of points of the point cloud;
- randomly select one or more points of the point cloud;
- define a second plane model based at least in part on the randomly selected one or more points of the point cloud;
- compare a fit of the first plane model to the first set of points of the point cloud and the randomly selected one or more points of the point cloud to a fit of the second plane model to the first set of points and the randomly selected one or more points of the point cloud; and
- responsive to determining that the fit of the second plane model is better than the fit of the first plane model, define the second plane model as the plane model.

12. The apparatus of claim 8, wherein the memory further contains instructions that, when executed by the processor, cause the apparatus to:
- determine that the at least one value of the characteristic size of the digital object is greater than the at least one value of the usable size of the plane;
- responsive to determining that the at least one value of the characteristic size of the digital object is greater than the at least one value of the usable size of the plane, determine whether the first detection area comprises additional points of the point cloud;
- responsive to determining that the first detection area does not comprise additional points of the point cloud, define a second detection area, wherein the second detection area comprises a second spatially defined subset of the scene data;
- define a second plane model based on points of the point cloud within the second detection area;
- define a second plane based on the second plane model;
- determine at least one value of a usable size of the second plane based on points of the point cloud;
- compare the at least one value of the characteristic size of the digital object to the at least one value of the usable size of the second plane; and
- responsive to determining that the at least one value of the characteristic size of the digital object is less than the at least one value of the usable size of the second plane, generate a display comprising the digital object positioned upon the second plane based on the second plane model.

13. The apparatus of claim 8, wherein the first detection area is defined based on at least one of: a field of view of a sensor providing the image data, a field of view of a sensor providing the depth data, or a point density of the point cloud.

14. The apparatus of claim 8, wherein the instructions that, when executed by the processor, cause the apparatus to define the plane model comprise:
- instructions that, when executed by the processor, cause the apparatus to determine the plane model based on a random sample consensus analysis of the points of the point cloud within the first detection area.

15. A non-transitory computer-readable medium containing instructions that, when executed by a processor, cause an apparatus to:
- obtain scene data, wherein the scene data comprises image data of a scene from an image sensor and depth data of the scene from a depth sensor, the depth data comprising depth measurement values of points of a point cloud,
- define a first detection area, wherein the first detection area comprises a spatially defined subset of the scene data of a size based on a characteristic size of a digital object,
- define a plane model based on points of the point cloud within the first detection area,
- define a plane based on the plane model, and
- iteratively expand the plane based on a subset of points of the point cloud, wherein the instructions when executed cause the apparatus, in each iteration of expanding the plane, to:
  - determine at least one value of a usable size of the plane based on the subset of points of the point cloud,
  - compare at least one value of the characteristic size of the digital object to the at least one value of the usable size of the plane, and
  - one of:
    - responsive to determining that the at least one value of the characteristic size of the digital object is greater than the at least one value of the usable size of the plane, expand the subset of points of the point cloud for a subsequent iteration of expanding the plane, or
    - responsive to determining that the at least one value of the characteristic size of the digital object is less than the at least one value of the usable size of the plane, generate a display comprising the digital object positioned upon the plane based on the plane model.

16. The non-transitory computer-readable medium of claim 15, further containing instructions that, when executed by the processor, cause the apparatus to:
- receive a target location, and
- define the first detection area based on the target location and the depth data.

17. The non-transitory computer-readable medium of claim 16, further containing instructions that, when executed by the processor, cause the apparatus to:
- perform object detection and recognition of the scene based on at least one of the image data or the depth data to obtain an object recognition result, and
- define the first detection area based at least in part on the object recognition result.

18. The non-transitory computer-readable medium of claim 15, wherein the instructions that, when executed by the processor, cause the apparatus to define the plane model comprise instructions that, when executed by the processor, cause the apparatus to:
- define a first plane model based on a first set of points of the point cloud;
- randomly select one or more points of the point cloud;
- define a second plane model based at least in part on the randomly selected one or more points of the point cloud;
- compare a fit of the first plane model to the first set of points of the point cloud and the randomly selected one or more points of the point cloud to a fit of the second plane model to the first set of points and the randomly selected one or more points of the point cloud; and responsive to determining that the fit of the second plane model is better than the fit of the first plane model, define the second plane model as the plane model.

19. The non-transitory computer-readable medium of claim 15, further containing instructions that, when executed by the processor, cause the apparatus to:

determine that the at least one value of the characteristic size of the digital object is greater than the at least one value of the usable size of the plane;

responsive to determining that the at least one value of the characteristic size of the digital object is greater than the at least one value of the usable size of the plane, determine whether the first detection area comprises additional points of the point cloud;

responsive to determining that the first detection area does not comprise additional points of the point cloud, define a second detection area, wherein the second detection area comprises a second spatially defined subset of the scene data;

define a second plane model based on points of the point cloud within the second detection area;

define a second plane based on the second plane model;

determine at least one value of a usable size of the second plane based on points of the point cloud;

compare the at least one value of the characteristic size of the digital object to the at least one value of the usable size of the second plane; and responsive to determining that the at least one value of the characteristic size of the digital object is less than the at least one value of the usable size of the second plane, generate a display comprising the digital object positioned upon the second plane based on the second plane model.

20. The non-transitory computer-readable medium of claim 15, wherein the instructions that, when executed by the processor, cause the apparatus to define the plane model comprise:

instructions that, when executed by the processor, cause the apparatus to determine the plane model based on a random sample consensus analysis of the points of the point cloud within the first detection area.

* * * * *